US011801939B2

(12) United States Patent
Groninga et al.

(10) Patent No.: US 11,801,939 B2
(45) Date of Patent: Oct. 31, 2023

(54) ROTOR SYSTEM WITH BELT DRIVEN PROPULSION AND STOWING

(71) Applicant: Bell Textron Inc., Fort Worth, TX (US)

(72) Inventors: Kirk Landon Groninga, Keller, TX (US); Brent Chadwick Ross, Flower Mound, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/667,675

(22) Filed: Feb. 9, 2022

(65) Prior Publication Data

US 2023/0249817 A1    Aug. 10, 2023

(51) Int. Cl.
| | | |
|---|---|---|
| *B64D 31/14* | (2006.01) | |
| *B64C 27/72* | (2006.01) | |
| *B64C 39/02* | (2023.01) | |
| *B64D 35/04* | (2006.01) | |
| *B64U 10/10* | (2023.01) | |
| *B64U 30/20* | (2023.01) | |

(52) U.S. Cl.
CPC ............ *B64C 39/024* (2013.01); *B64C 27/72* (2013.01); *B64D 31/14* (2013.01); *B64D 35/04* (2013.01); *B64U 10/10* (2023.01); *B64U 30/20* (2023.01)

(58) Field of Classification Search
CPC ........ B64C 27/72; B64D 31/14; B64D 35/04; B64U 10/10; B64U 30/20
See application file for complete search history.

(56) References Cited

U.S. PATENT DOCUMENTS

| | | | |
|---|---|---|---|
| 2018/0244377 A1* | 8/2018 | Chan ..................... | B64C 39/024 |
| 2018/0290735 A1* | 10/2018 | Uptigrove ........... | B64C 29/0025 |
| 2021/0323691 A1* | 10/2021 | Foster ................... | B64D 27/04 |

FOREIGN PATENT DOCUMENTS

| | | | | |
|---|---|---|---|---|
| CN | 108791855 A | * | 11/2018 | |
| JP | 6606648 B1 | * | 11/2019 | ............. B64C 11/34 |

\* cited by examiner

*Primary Examiner* — Tye William Abell
(74) *Attorney, Agent, or Firm* — Lightfoot & Alford PLLC

(57) ABSTRACT

A vehicle includes a first rotor system having a rotor blade having an axis of rotation, a rotatable inboard drive component, and a rotatable outboard drive component. The first rotor system further includes a flexible closed loop component associated with each of the inboard drive component and the outboard drive component. Movement of the closed loop component can selectively cause at least one of rotation of the rotor blade about the axis of rotation and movement of the axis of rotation.

20 Claims, 19 Drawing Sheets

ROTOR SYSTEM WITH BELT DRIVEN PROPULSION AND STOWING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Vehicles with multiple rotor systems are known to utilize power plants, such as electric motors or engines, that are generally collocated with the rotor systems away from a center of gravity of the vehicle. Conventional vehicles with multiple rotor systems that use a single power plant for powering multiple rotor systems may locate the power plant away from one or more rotor systems, but the rotor systems are typically connected to the power plant using heavy rotatable shafts. There remains a need for vehicles having multiple rotor systems that are not only lighter but also easily reconfigurable to move the rotor systems between stowed and deployed configurations.

DETAILED DESCRIPTION

Figure 1:
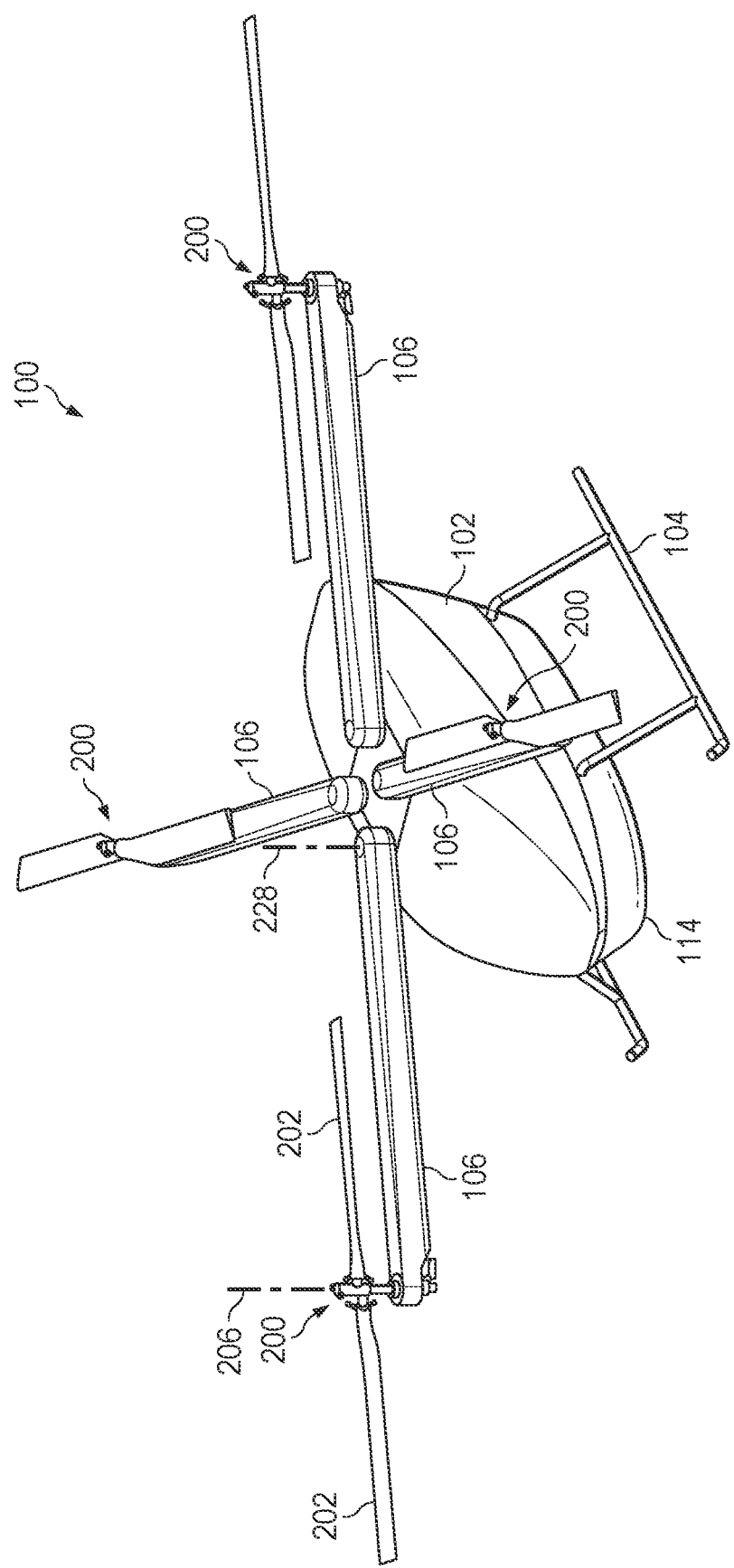
FIG. 1 is an oblique view of an aircraft according to an embodiment of this disclosure having a folding rotor system shown in a deployed configuration according to an embodiment of this disclosure.
Figure 2:
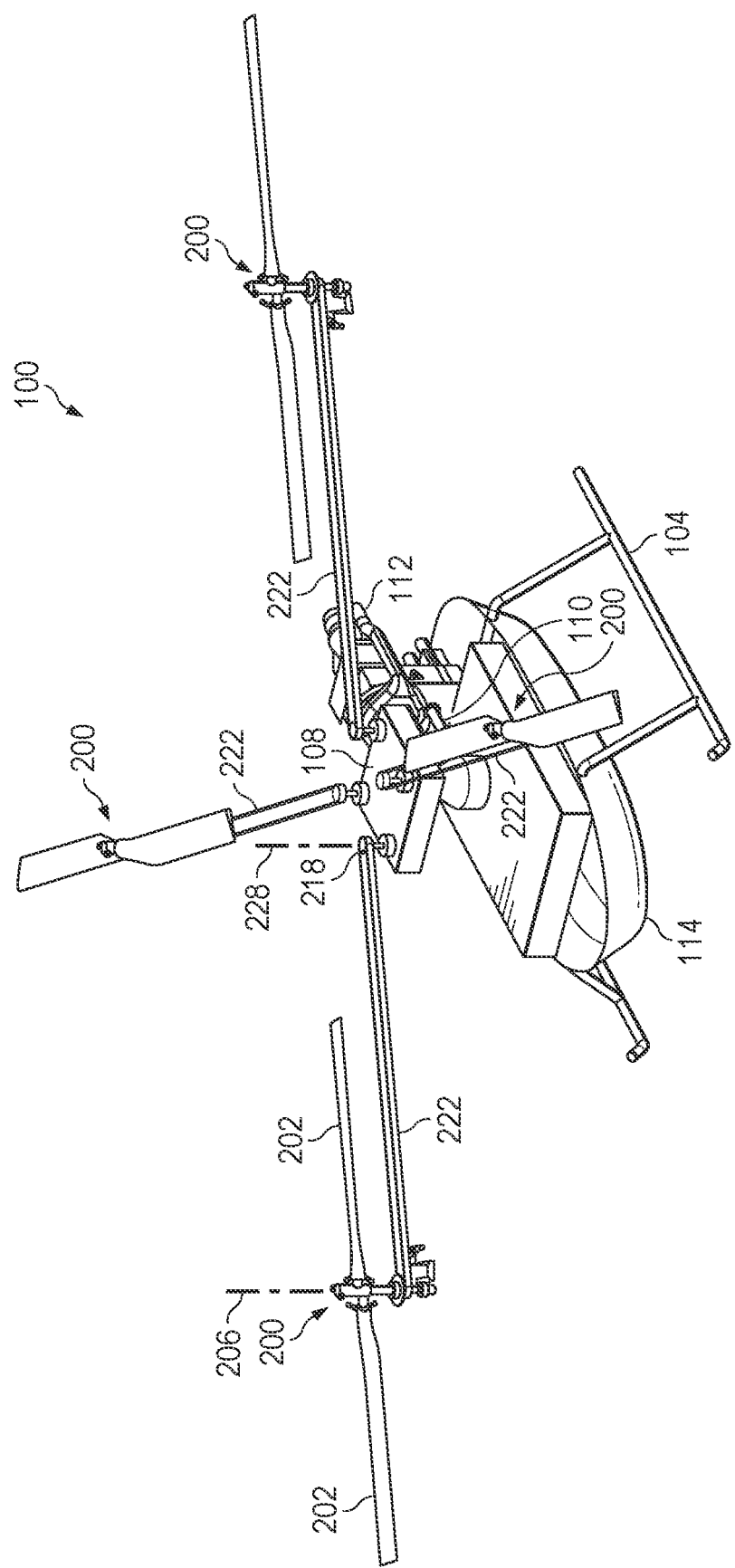
FIG. 2 is an oblique view of a portion of the aircraft of FIG. 1 showing the rotor system in a deployed configuration.
Figure 3:
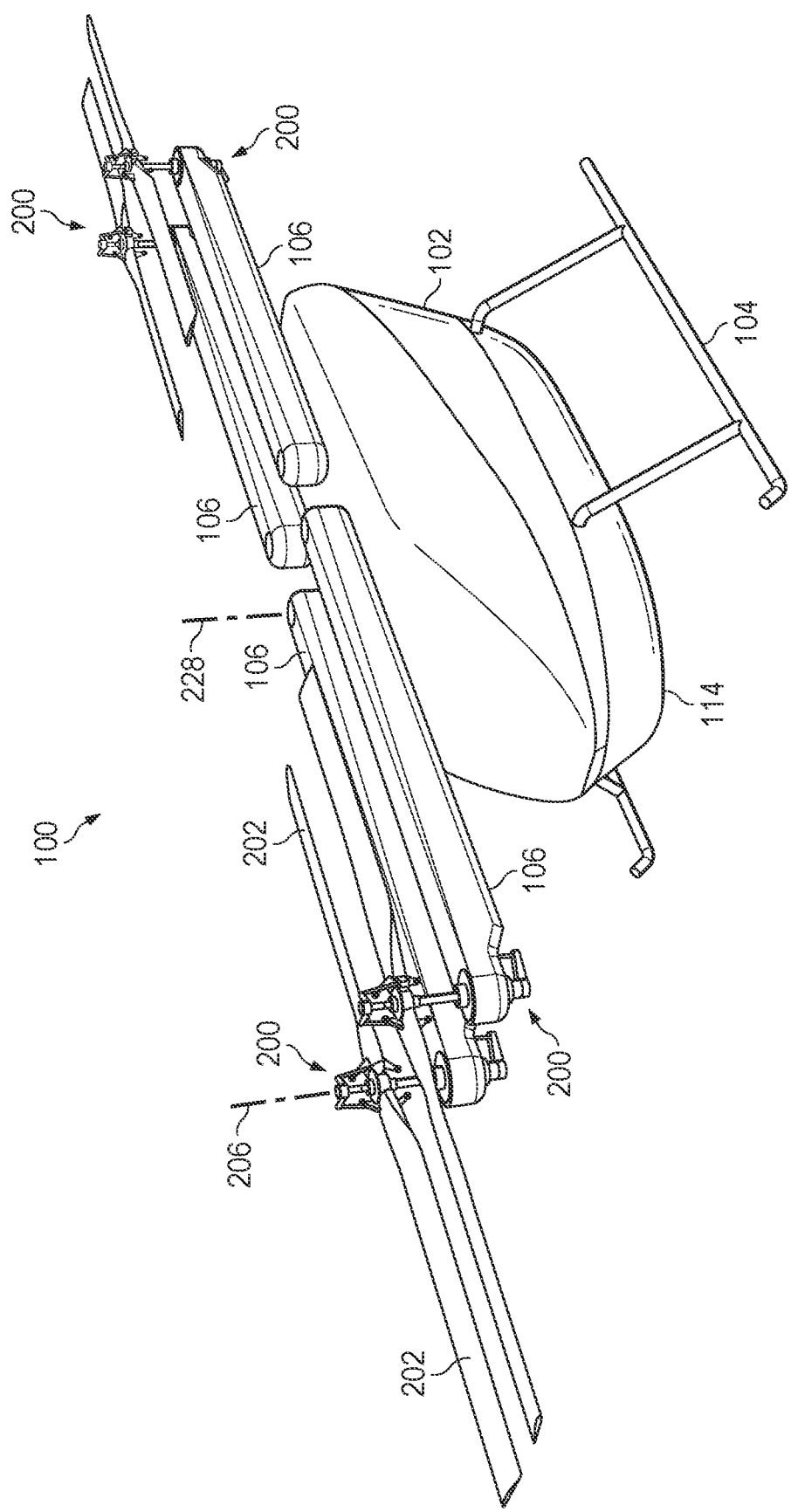
FIG. 3 is an oblique view of the aircraft of FIG. 1 showing the rotor system in a stowed configuration.
Figure 4:
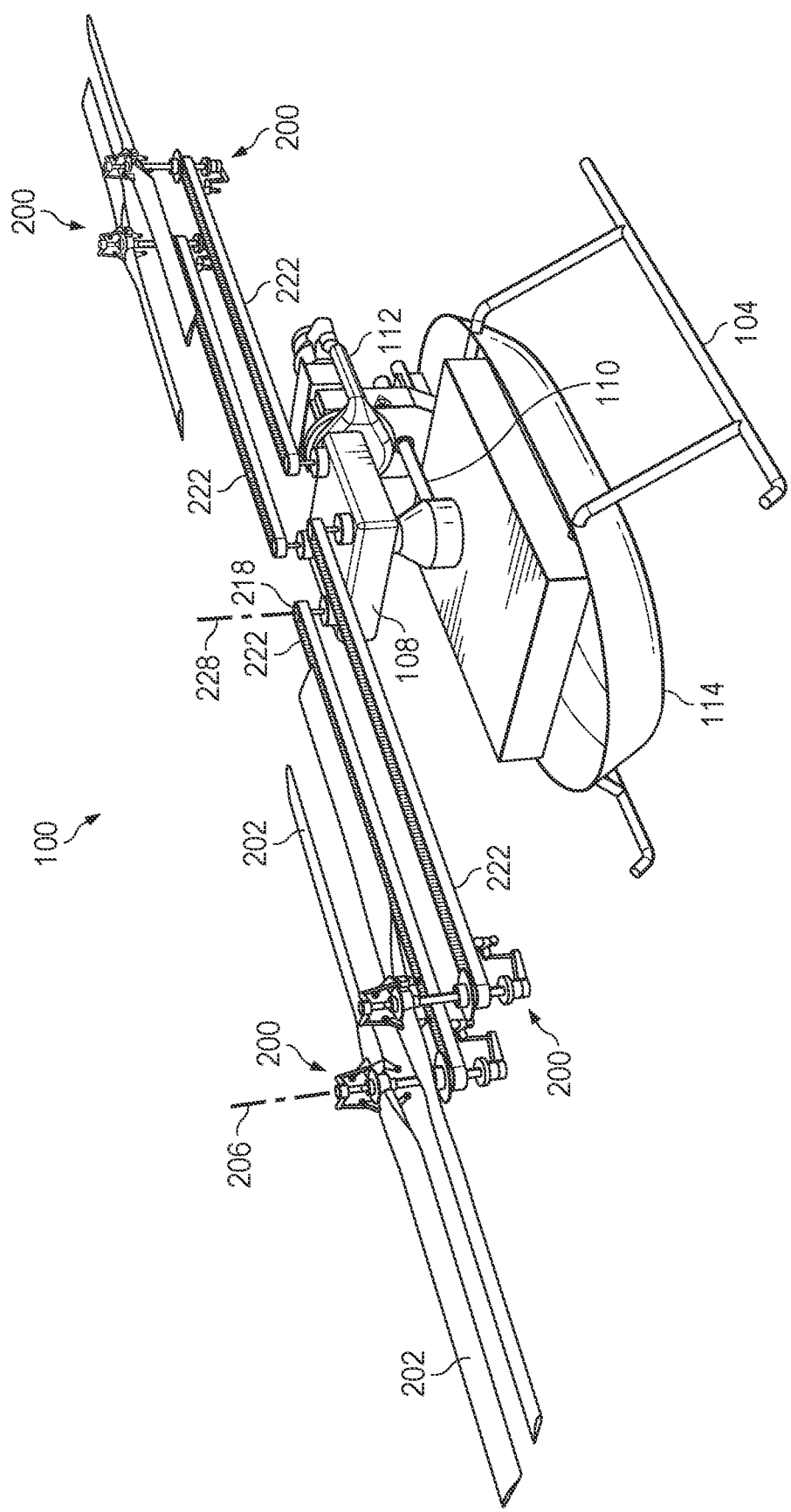
FIG. 4 is an oblique view of a portion of the aircraft of FIG. 1 showing the rotor system in a stowed configuration.
Figure 5:
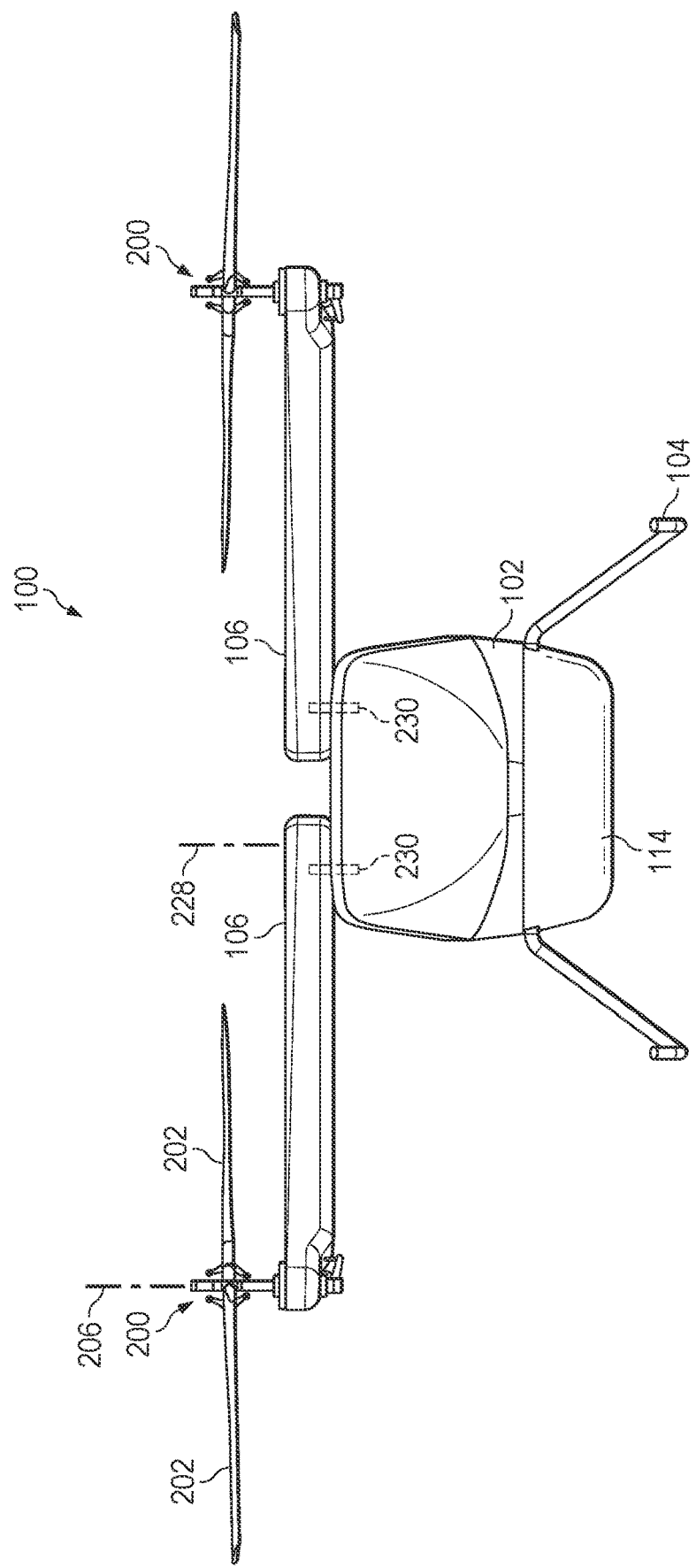
FIG. 5 is a front view of the aircraft of FIG. 1 showing the rotor system in a deployed configuration.
Figure 6:
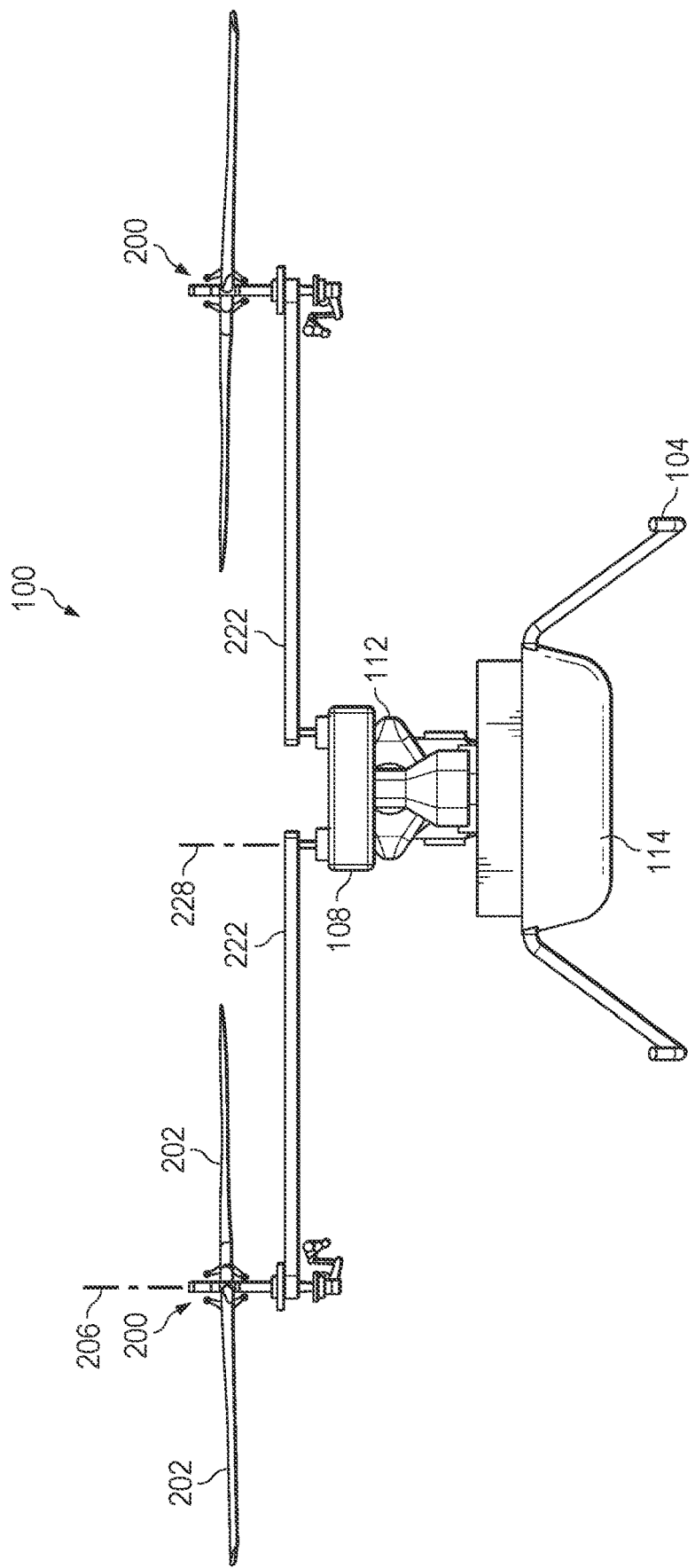
FIG. 6 is a front view of a portion of the aircraft of FIG. 1 showing the rotor system in a deployed configuration.
Figure 7:
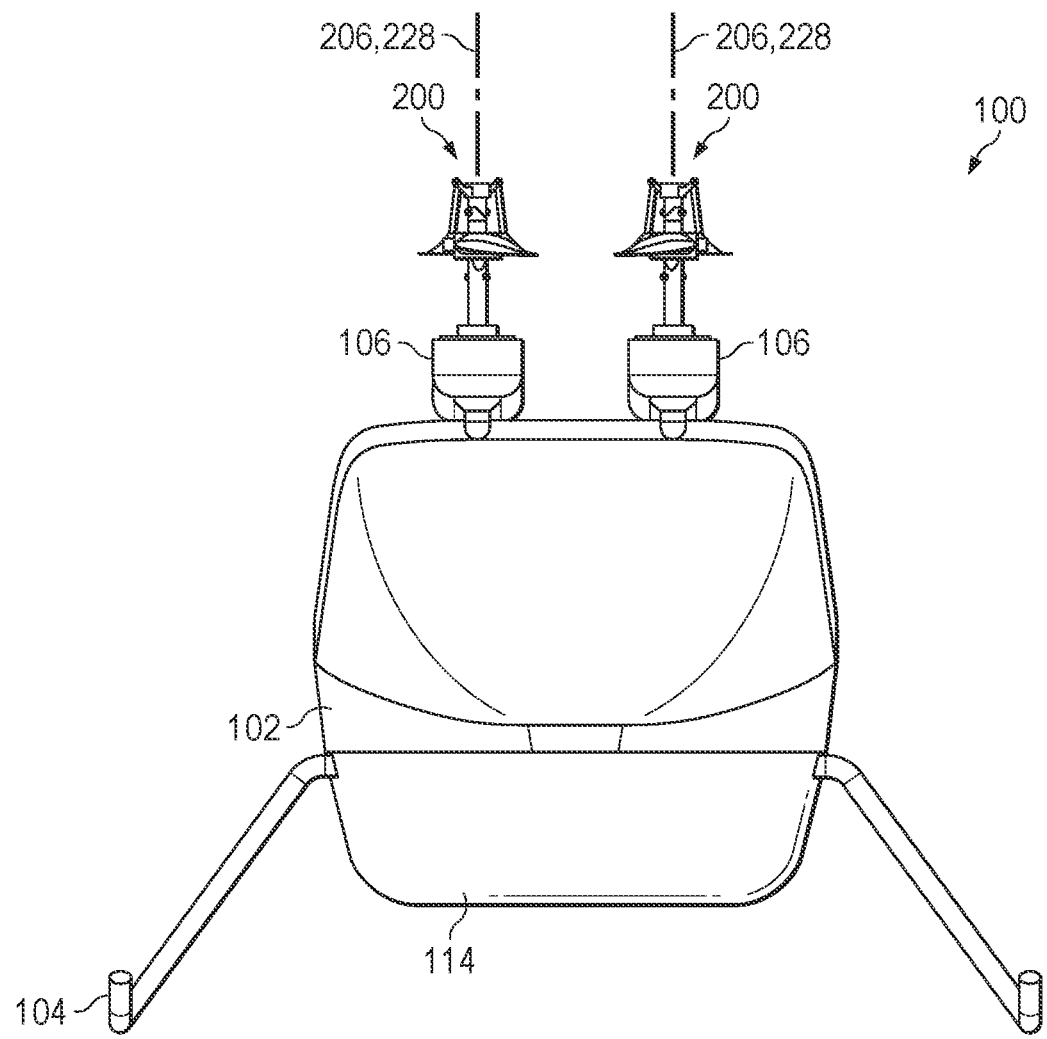
FIG. 7 is a front view of the aircraft of FIG. 1 showing the rotor system in a stowed configuration.
Figure 8:
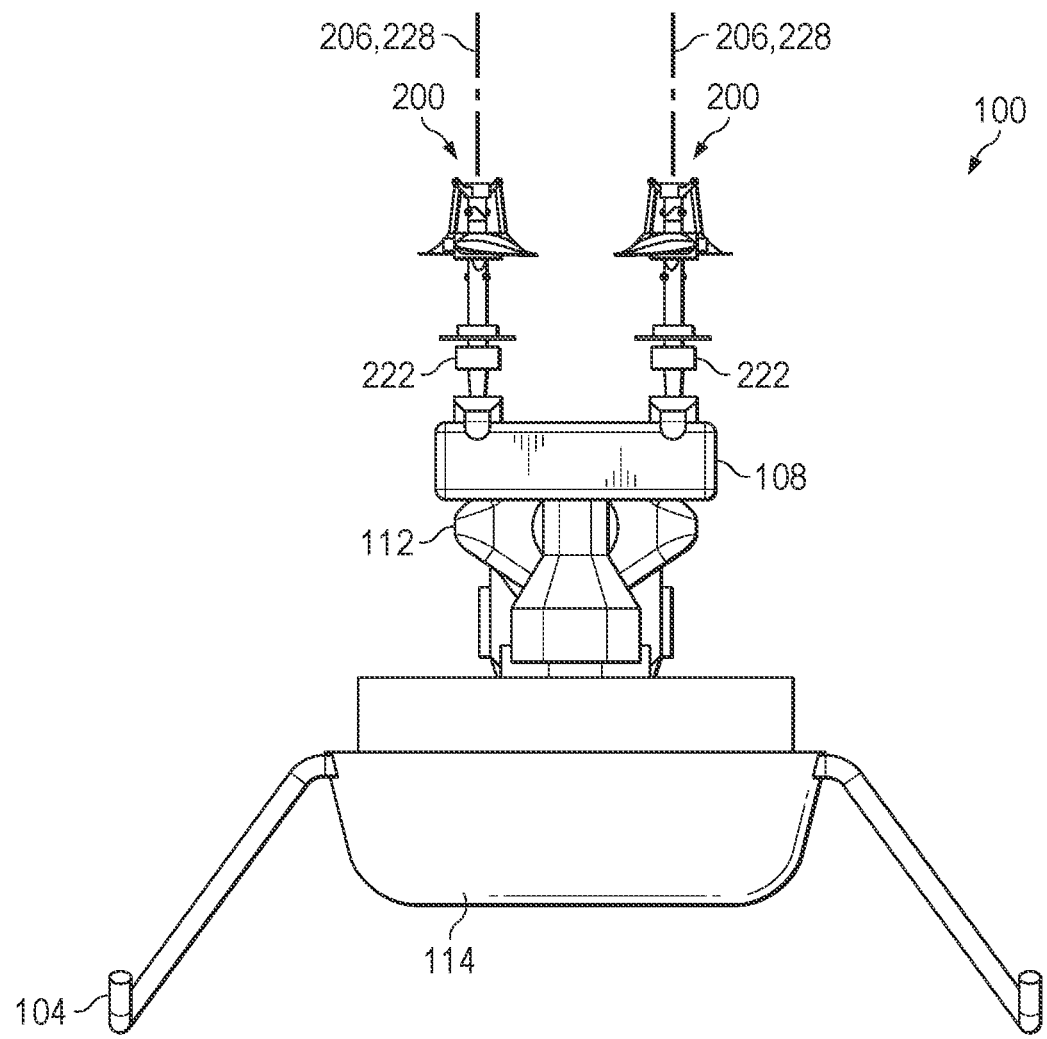
FIG. 8 is a front view of a portion of the aircraft of FIG. 1 showing the rotor system in a stowed configuration.
Figure 9:
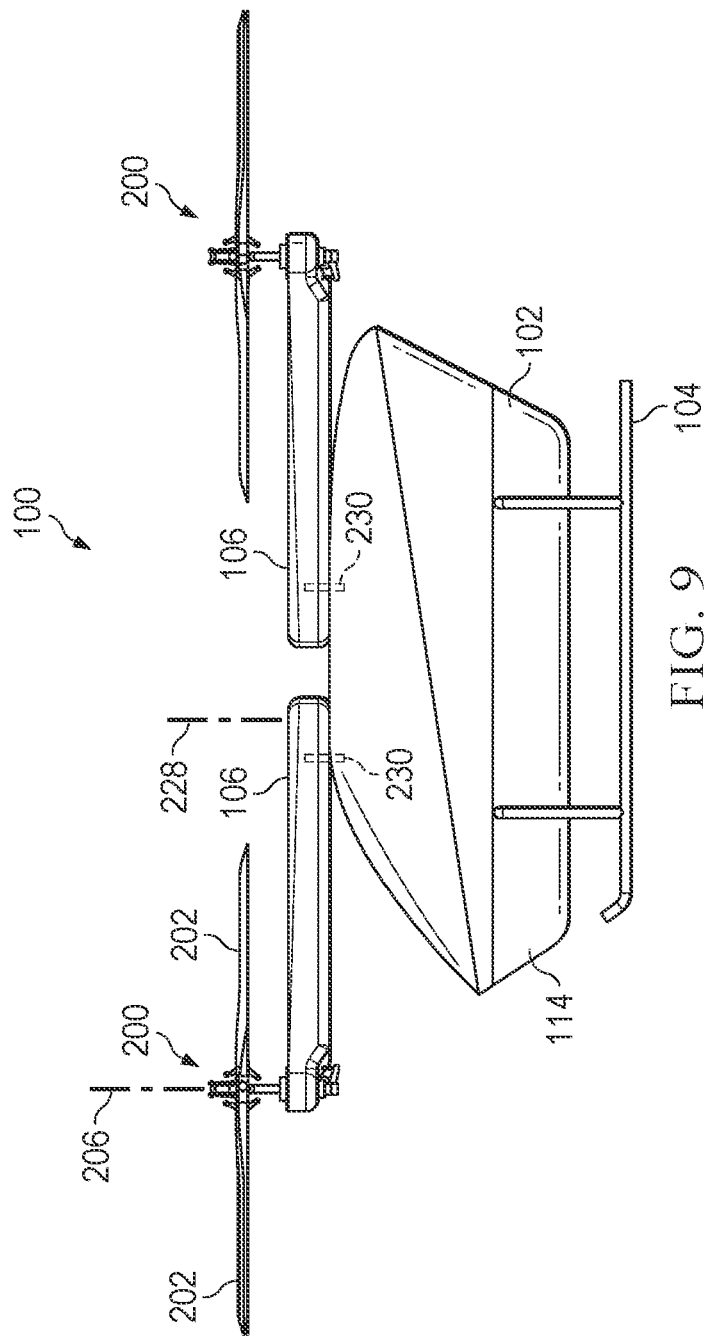
FIG. 9 is a side view of the aircraft of FIG. 1 showing the rotor system in a deployed configuration.
Figure 10:
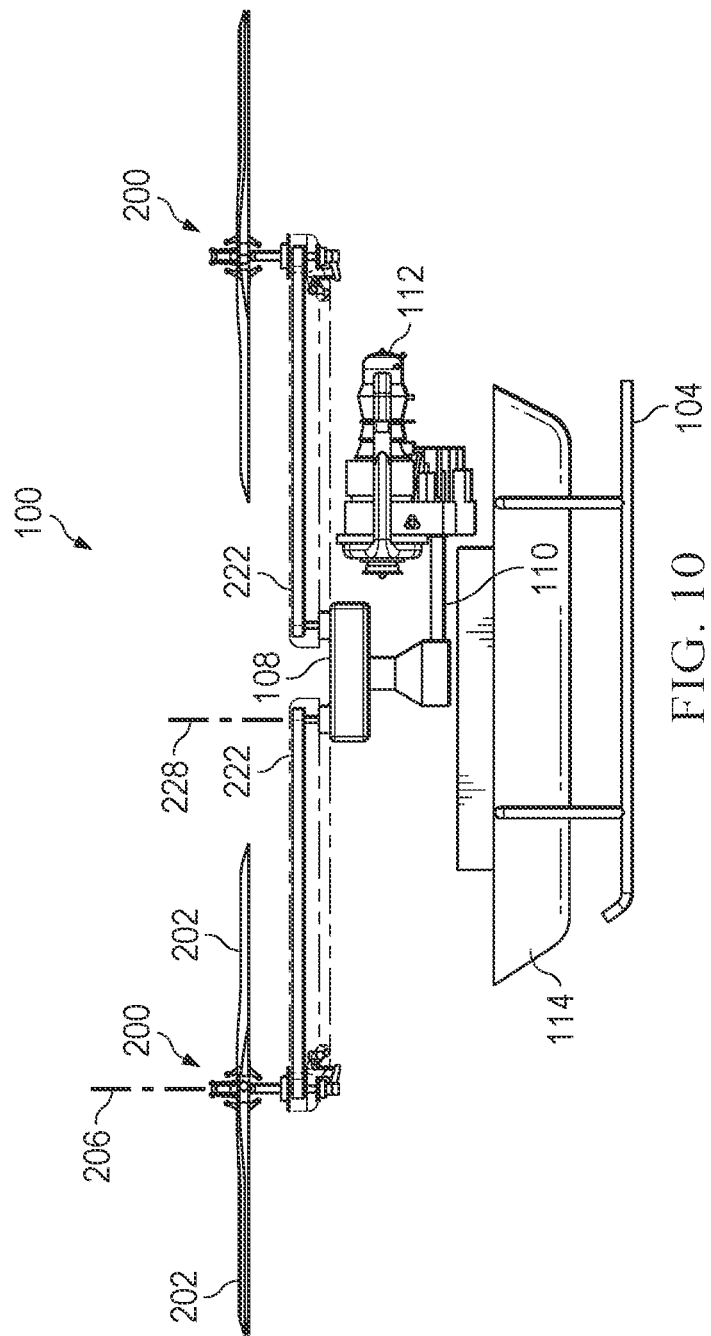
FIG. 10 is a side view of a portion of the aircraft of FIG. 1 showing the rotor system in a deployed configuration.
Figure 11:
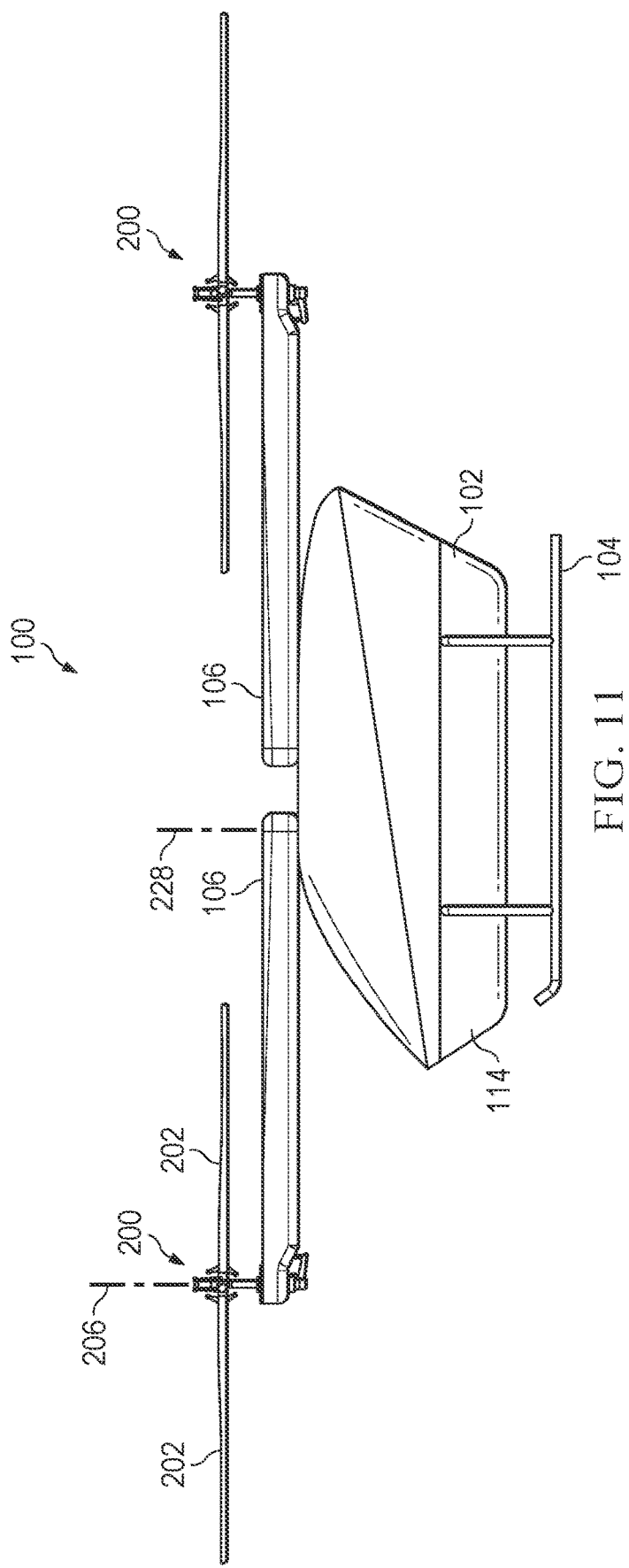
FIG. 11 is a side view of the aircraft of FIG. 1 showing the rotor system in a stowed configuration.
Figure 12:
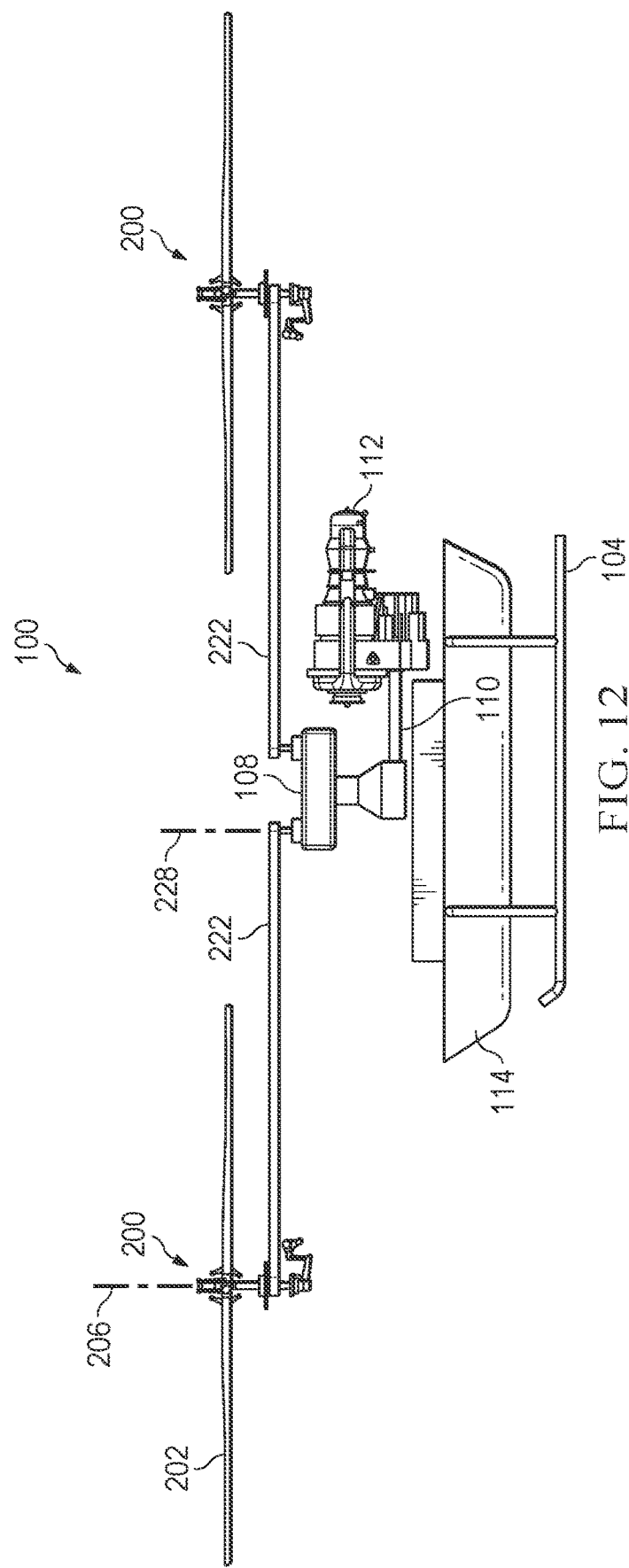
FIG. 12 is a side view of a portion of the aircraft of FIG. 1 showing the rotor system in a stowed configuration.
Figure 13:
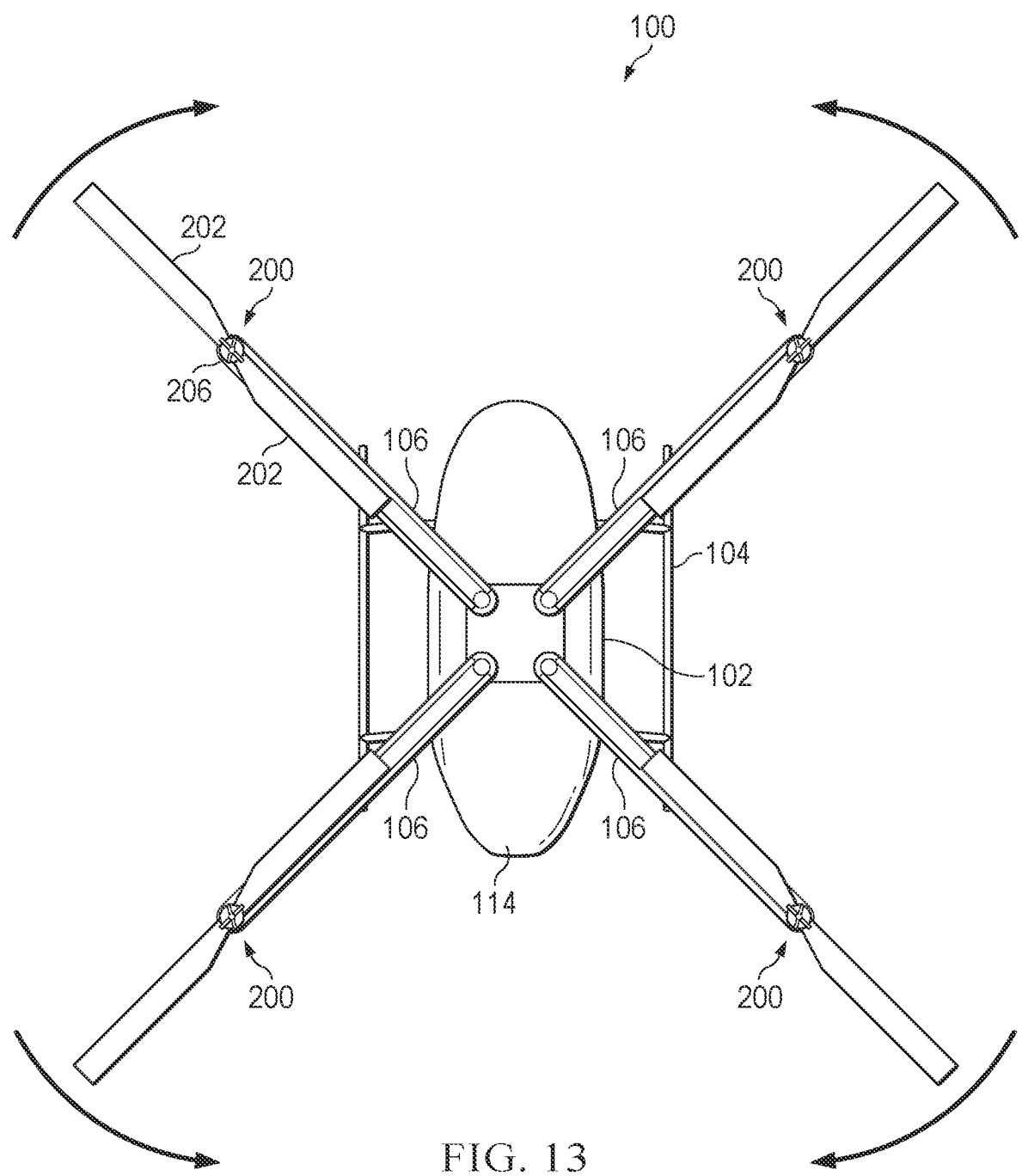
FIG. 13 is a top view of the aircraft of FIG. 1 showing the rotor system in a deployed configuration.
Figure 14:
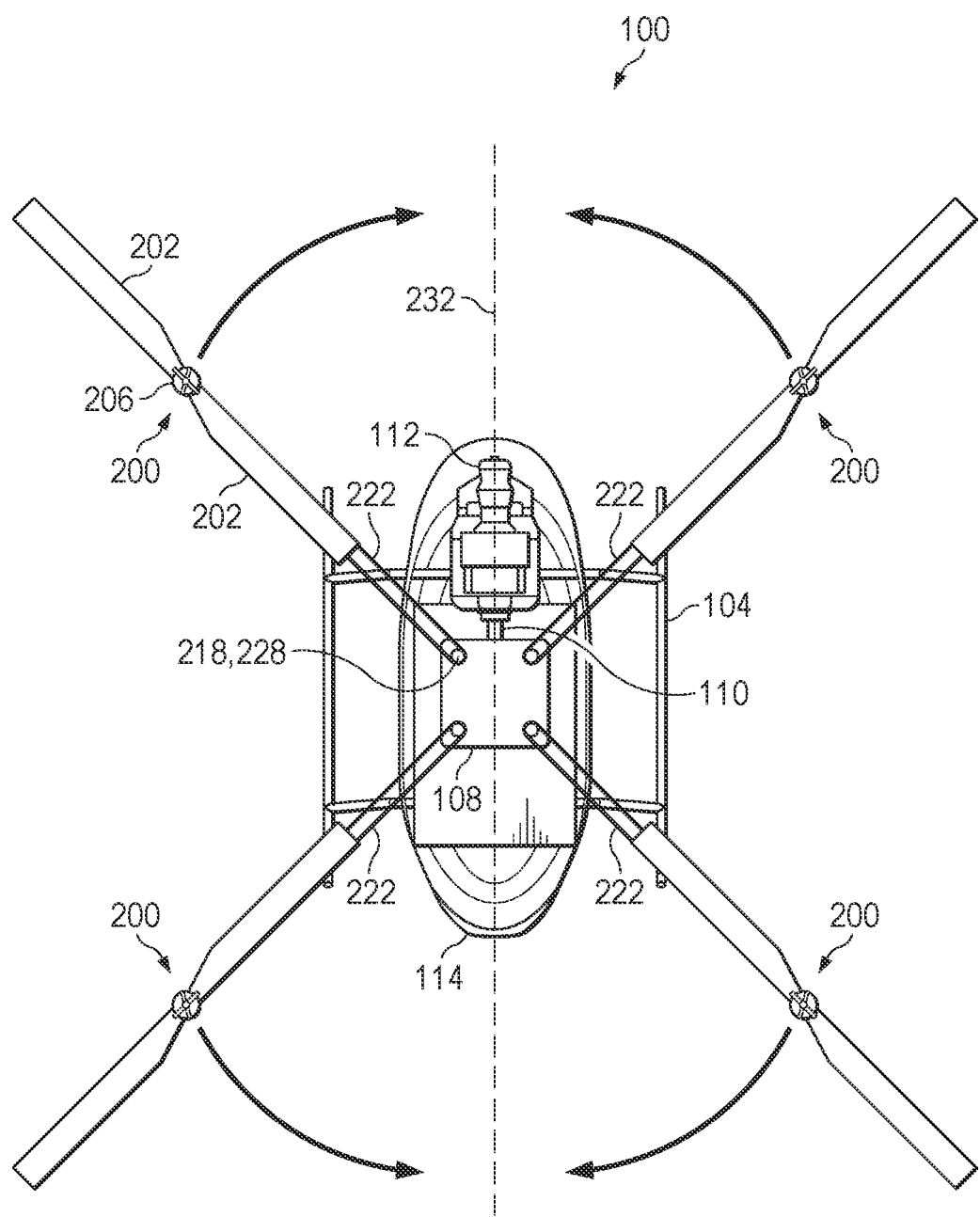
FIG. 14 is a top view of a portion of the aircraft of FIG. 1 showing the rotor system in a deployed configuration.
Figure 15:
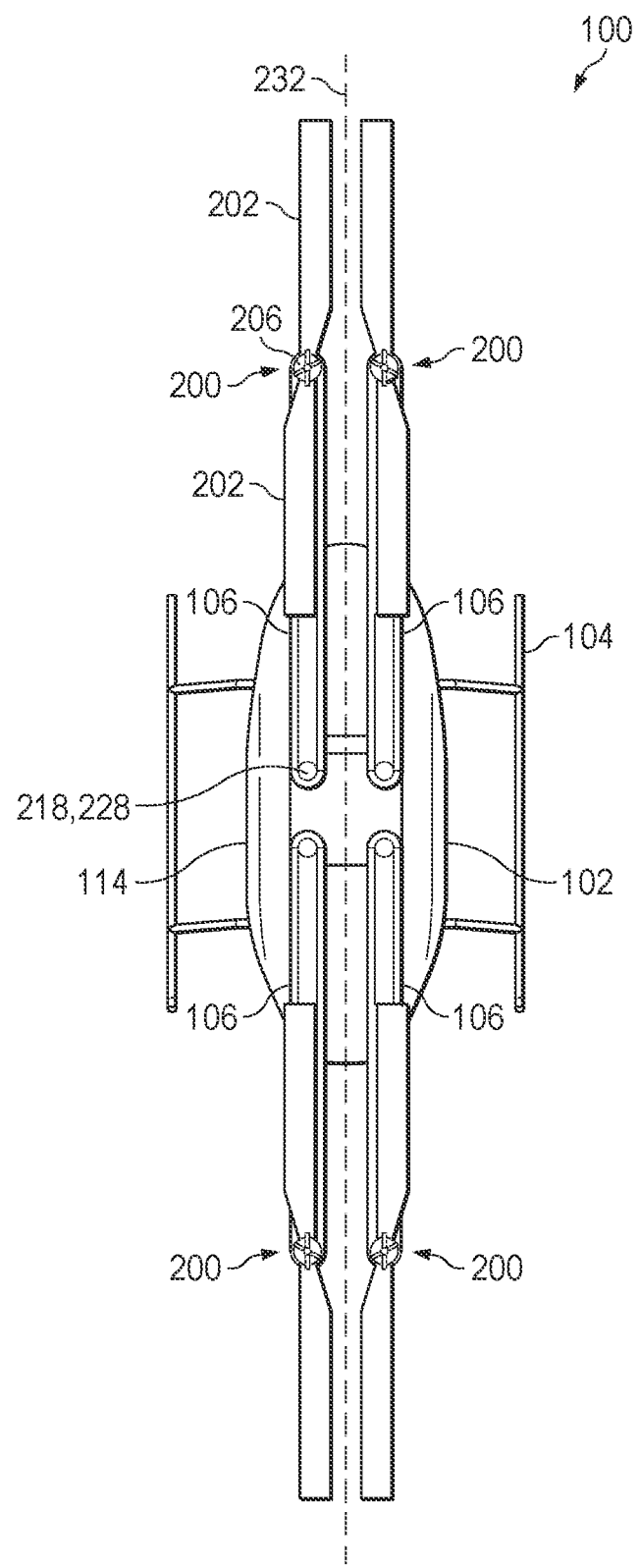
FIG. 15 is a top view of the aircraft of FIG. 1 showing the rotor system in a stowed configuration.
Figure 16:
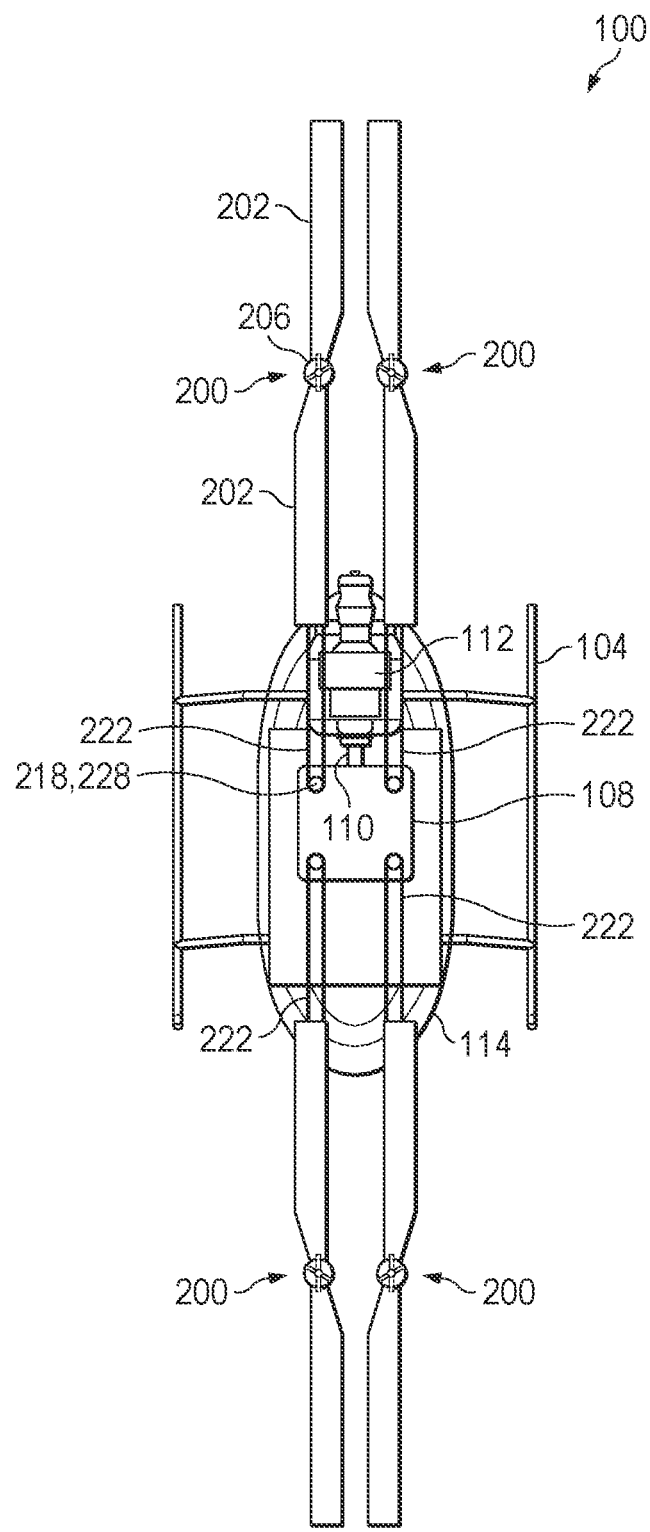
FIG. 16 is a top view of a portion of the aircraft of FIG. 1 showing the rotor system in a stowed configuration.

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring now to FIGS. 1-16, an aircraft 100 is shown as comprising a fuselage 102, landing gear 104, a plurality of rotor systems 200 carried by rotor arms 106, a transmission 108, a drive shaft 110, and a power plant 112. Most generally, FIGS. 1, 3, 5, 7, 9, 11, 13, and 15 show aircraft 100 in its entirety while FIGS. 2, 4, 6, 8, 10, 12, 14, and 16 show only portions of aircraft 100. More specifically, FIGS. 2, 4, 6, 8, 10, 12, 14, and 16 show aircraft 100 without some external components, such as rotor arms 106 and some fuselage panels 114, to allow viewing of components carried within rotor arms 106 and fuselage 102. Further, while FIGS. 1, 2, 5, 6, 9, 10, 13, and 14 show aircraft 100 with rotor systems 200 in a deployed configuration, FIGS. 3, 4, 7, 8, 11, 12, 15, and 16 show aircraft 100 with rotor systems 200 in a stowed configuration. It will be appreciated that while power plant 112 is shown as a turbine or internal combustion engine, in alternative embodiments, a power plant can comprise an electric motor or any other suitable system for powering rotation of drive shaft 110.

Figure 17:
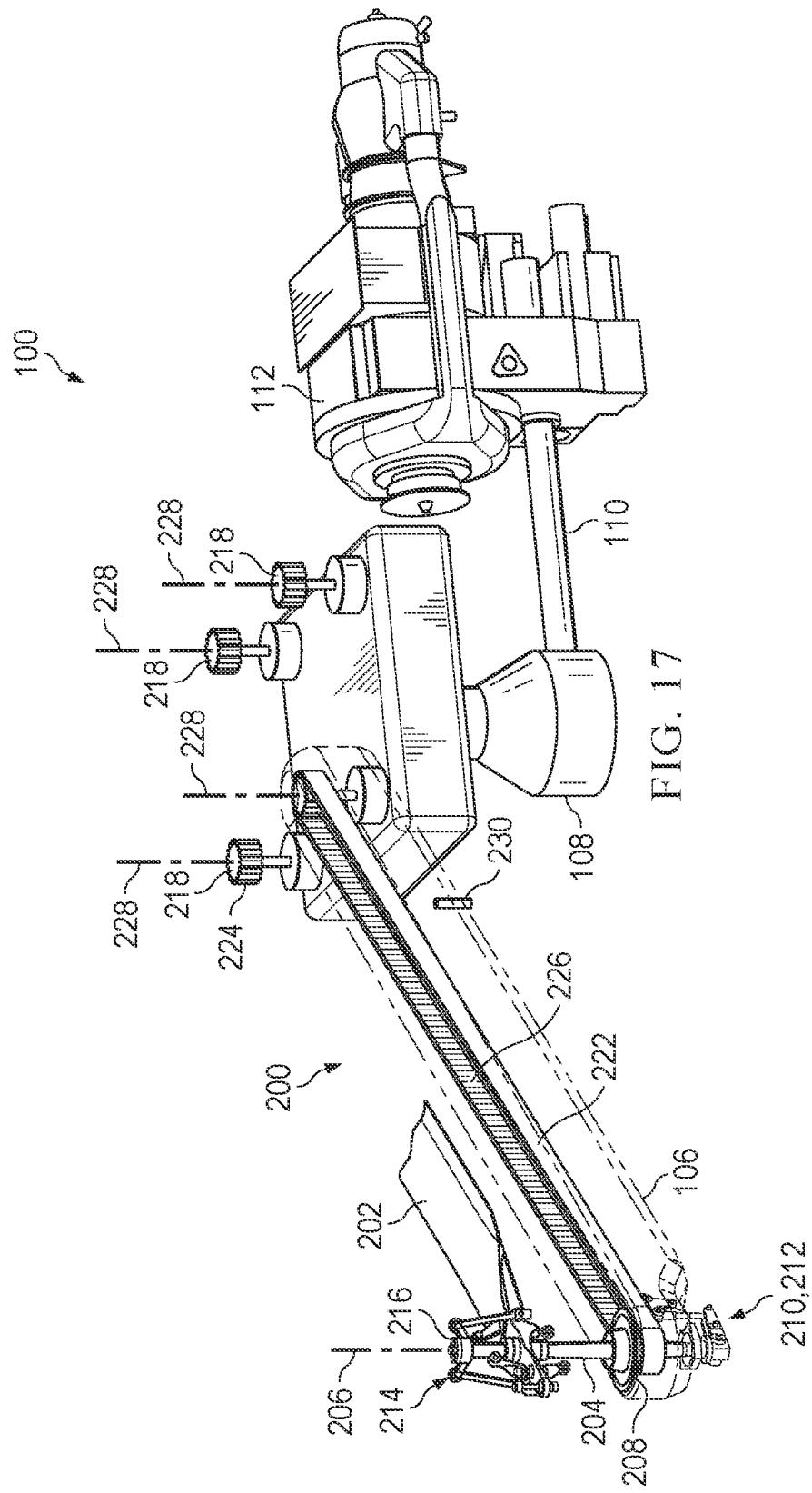
FIG. 17 is an oblique view of a portion of the aircraft of FIG. 1 showing the rotor system in a deployed configuration.
Figure 18:
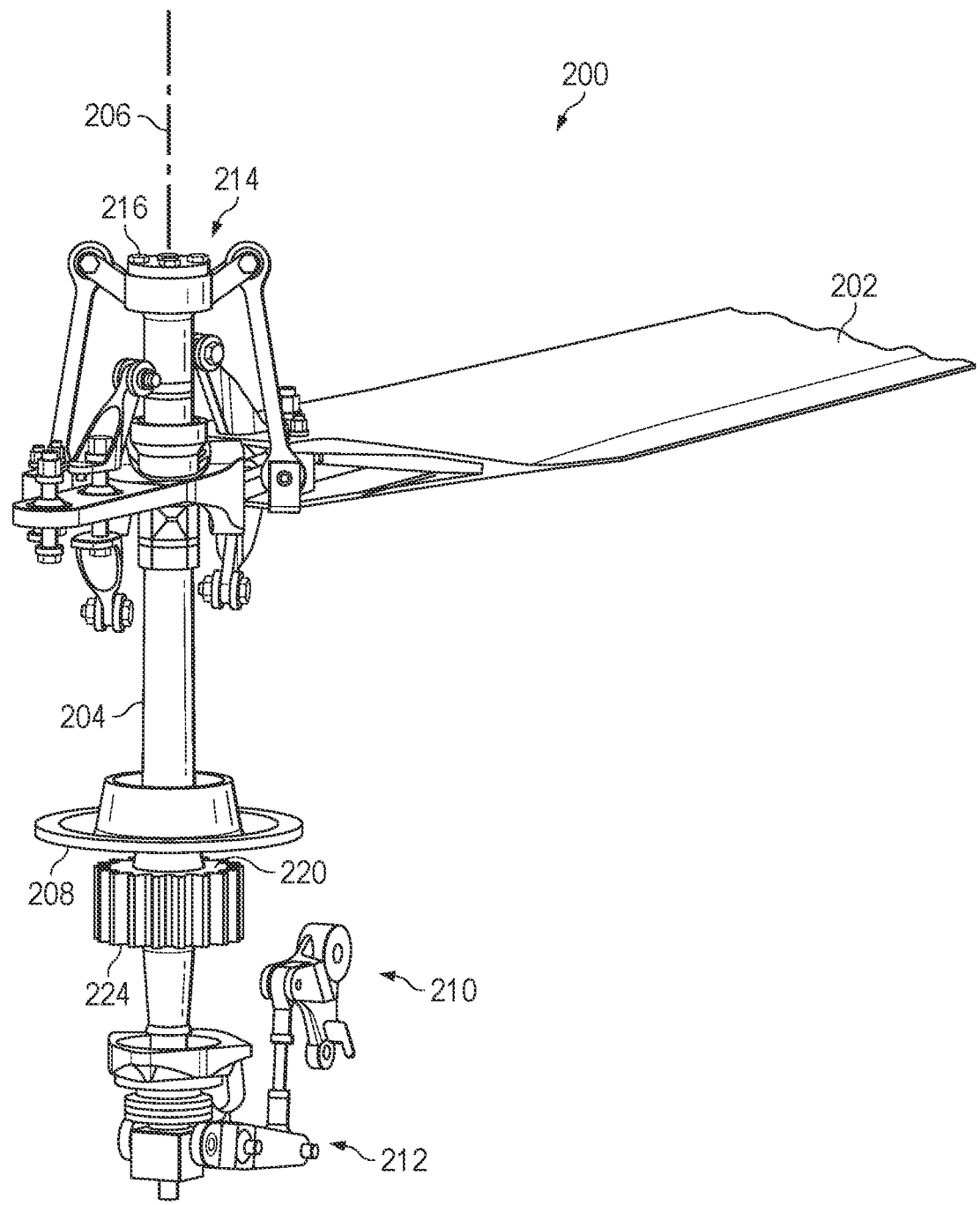
FIG. 18 is an oblique view of a portion of the aircraft of FIG. 1 showing a portion of the rotor system in isolation.

Referring now to FIGS. 17 and 18, close up views of portions of aircraft 100 are shown to better illustrate the details of a rotor system 200. FIG. 17 shows rotor arm 106 as transparent with an outline to allow visualization of the components as disposed within an interior space of rotor arm 106 while FIG. 18 shows a portion of a rotor system 200 in isolation. Rotor systems 200 generally comprise rotor blades 202 that are supported and driven by rotor shafts 204. Rotor shafts 204 are configured to selectively rotate rotor blades 202 about a rotor blade axis of rotation 206. The rotor shafts 204 are secured relative to rotor arms 106 using a shaft mount 208 that houses a bearing system. Rotor systems 200 further comprise a collective control system 210 that comprises a lower actuation mechanism 212 that is connected to an upper actuation mechanism 214 via a control rod 216 that is slidably received through rotor shaft 204. It will be appreciated that collective control systems 210 operate in a conventional manner insofar as mechanical inputs to the lower actuation mechanism 212 are transferred to upper actuation mechanism 214 via control rod 216. Upper actuation mechanism 214 is configured to selectively rotate rotor blades 202 about a pitch change axis in response to the inputs provided to the lower actuation mechanism 212.

In this embodiment, rotor system 200 further comprises an inboard drive component 218, an outboard drive component 220, and a flexible closed loop component 222. In this embodiment, inboard drive component 218 and outboard drive component 220 each comprise toothed gears and closed loop component 222 comprises a toothed belt. In this embodiment, gear teeth 224 and belt teeth 226 are configured so that they complement each other and mesh in a conventional manner so that slippage between the closed loop component 222 and each of the inboard drive component 218 and outboard drive component 220 is minimized or prevented. Accordingly, under normal operation, rotation of either of the inboard drive component 218 and the outboard drive component 220 will cause progression of the closed loop component 222 and synchronous movement of each of the inboard drive component 218 and outboard drive component 220.

Each rotor system 200 comprises an inboard drive component 218 that is meshed with components of transmission 108 in a conventional manner. Accordingly, in this embodiment, rotation of any of the inboard drive components 218 causes rotation of the other inboard drive components 218, progression of each of the closed loop components 222, and ultimately rotation of each of the outboard drive components 220. Because the outboard drive components 220 are fixed to rotor shafts 204, rotation of the outboard drive components 220 also results in rotation of each of the rotor shafts 204 and associated rotor blades 202.

In this embodiment, transmission 108 is driven by drive shaft 110 which is selectively rotated by engine 112. Transmission 108 is configured so that adjacent ones of the inboard drive components 218 are caused to rotate in opposite directions about their respective inboard rotation axes 228. Accordingly, a sum of torques generated by rotation of the rotor blades 202 is substantially zero which allows stable operation of the aircraft 100 without the need for other counter torque mechanisms and methods.

In this embodiment, aircraft 100 comprises one or more locking mechanisms configured to selectively lock one or more rotor arms 106 into place relative to transmission 108. For example, in this embodiment, each rotor arm 106 is provided with a locking mechanism that selectively engages fuselage 102 to lock rotor arms 106 in either the stowed configuration or the deployed configuration. In alternative embodiments, not all rotor arms 106 are provided with independent locking mechanisms. For example, in some cases, the locking functionality of a single locking mechanism, due to the synchronistic kinematic arrangement, locks not only the rotor arm 106 associated with the locking mechanism but also the other rotor arms 106 since their movement is moved in concert with the controlling and lockable rotor arm 106. In this embodiment, rotor arms 106 can be move to and between the stowed and deployed configuration locations and can be selectively locked using retractable pins 230 that can be received within receptacles formed in or carried by fuselage 102. More specifically, rotor arms 106 can be disposed in a deployed quadcopter arrangement and locked in the deployed configuration using retractable pins 230. Similarly, rotor arms 106 can be disposed in a stowed arrangement in which rotor arms 106 are brought into positions substantially parallel to a bisection plane 232 that longitudinally bisects aircraft 100 when viewed from above.

It will be appreciated that in alternative embodiments, more or fewer rotor systems 200 and/or associated rotor arms can be utilized, such as, but not limited to, providing an octocopter type arrangement. Further, any other suitable means for locking rotor systems into place can be utilized. Still further, while a toothed belt and complimentary toothed gears are utilized in this embodiment, alternative embodiments can utilize chains, untoothed belts, circular cross-section belts, pulleys, and/or any other suitable means for transferring rotational power to a flexible closed loop component.

In this embodiment, transmission 108, drive shaft 110, and engine 112 are each disposed within fuselage 102, but in alternative embodiments, one or more of the components can be located at least partially outside an envelope of the fuselage or there may be no fuselage utilized. Aircraft 100 is substantially lighter and more easily maneuvered than conventional aircraft in some embodiments because the mass of transmission 108, drive shaft 110, and engine 112 are generally centrally located relative to the footprint of the aircraft when rotor systems are deployed. More specifically, there can be advantages to locating mass centrally as opposed to near the axes of rotation of the rotor blades. Further, the flexible closed loop components disclosed herein are generally lighter than metallic drive shafts that would conventionally be extended along rotor arms to drive rotor systems from a shared and centrally located transmission.

Figure 19:
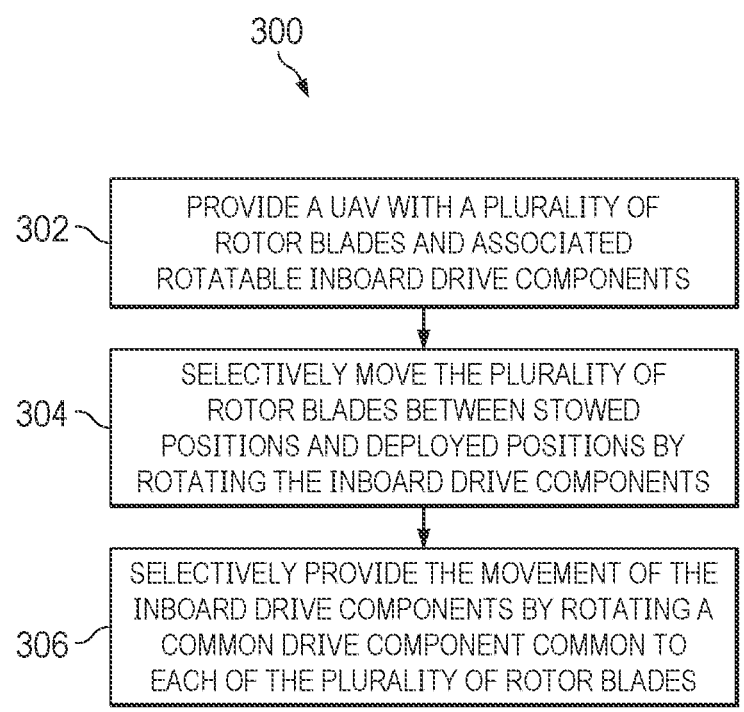
FIG. 19 is a flowchart of a method of operating an aircraft.

Referring to FIG. 19, a flowchart of a method 300 of operating an aircraft is shown. Method 300 can begin at block 302 by providing an unmanned aerial vehicle (UAV) with a plurality of rotor blades and associated rotatable inboard drive components. The method can continue at block 304 by selectively moving the plurality of rotor blades between stowed positions and deployed positions by rotating the inboard drive components. The method can continue at block 306 by selectively providing the movement of the inboard drive components by rotating a common drive component that is common to each of the plurality of rotor blades. In the embodiment disclosed, the common drive component can comprise the drive shaft, a component of the transmission, one of the inboard drive components, one of the flexible closed loop components, one of the outboard drive components, or even a rotor blade. In essence, in some embodiments, moving any single component within the kinematically bound systems can result in rotation of rotor blades and/or rotor arms, depending on whether the rotor arms are locked in position relative to the transmission.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A vehicle, comprising:
   a first rotor system, comprising:
   a rotor blade having an axis of rotation;
   a rotatable inboard drive component having an inboard drive component axis;
   a rotatable outboard drive component; and
   a flexible closed loop component associated with each of the inboard drive component and the outboard drive component;
   wherein movement of the closed loop component can selectively cause rotation of the rotor blade about the axis of rotation and movement of the axis of rotation; and
   wherein no additional closed loop components encircle the inboard drive component axis and no additional closed loop components encircle the axis of rotation.

2. The vehicle of claim 1, wherein at least one of the inboard drive component and the outboard drive component comprises at least one of a gear, a pulley, and a shaft.

3. The vehicle of claim 1, wherein the movement of the axis of rotation is configured to be along a substantially circular arc about an axis of rotation of the inboard drive component.

4. The vehicle of claim 1, further comprising:
   a second rotor system substantially similar to the first rotor system, the second rotor system comprising a second rotor blade axis of rotation; and
   a power plant configured to selectively power the first rotor system and the second rotor system;
   wherein, without disconnecting either of the first rotor system and the second rotor system from the power plant, the rotor blade axis of rotation of the first rotor system and the rotor blade axis of rotation of the second rotor system can be moved between a deployed configuration and a stowed configuration.

5. The vehicle of claim 1, wherein the closed loop component comprises at least one of a chain and a belt.

6. The vehicle of claim 5, wherein the closed loop component comprises a profile complementary to a profile of at least one of the inboard drive component and the outboard drive component.

7. The vehicle of claim 1, further comprising:
   a rotor arm.

8. The vehicle of claim 7, wherein at least a portion of at least one of the inboard drive component, the outboard drive component, and the closed loop component is disposed within an interior space of the rotor arm.

9. The vehicle of claim 7, further comprising:
   a collective control system configured to selectively change a pitch of the rotor blade.

10. The vehicle of claim 9, wherein at least a portion of the collective control system is disposed within an interior space of the rotor arm.

11. The vehicle of claim 9, wherein at least a portion of the collective control system is carried by the rotor arm.

12. An unmanned aerial vehicle (UAV), comprising:
    a fuselage;
    a power plant at least partially disposed within the fuselage;
    a transmission;
    a drive shaft connected between the power plant and the transmission;
    a plurality of rotor systems, each rotor system comprising a rotor blade comprising an axis of rotation;
    wherein at least one of the rotor systems is powered by a flexible closed loop component that transfers power from the transmission to the at least one of the rotor systems and wherein movement of the flexible closed loop component can move the axis of rotation of the rotor blade of the at least one of the rotor systems relative to the transmission; and
    wherein no axis of rotation of the transmission is encircled by multiple flexible closed loop components.

13. The UAV of claim 12, wherein the movement of the axis of rotation relative to the transmission comprises changing an overall widthwise footprint of the UAV.

14. The UAV of claim 12, wherein the closed loop component comprises a toothed belt.

15. The UAV of claim 12, wherein movement of the flexible closed loop component can cause movement of a second closed loop component via the transmission.

16. The UAV of claim 12, wherein the UAV comprises at least four of the rotor systems and wherein the at least four rotor systems comprise rotor arms that are moveable between a stowed configuration and a deployed configuration.

17. The UAV of claim 16, wherein movement of each of the at least four rotor systems is synchronous so that movement of any one of the at least four rotor systems between the stowed configuration and the deployed configuration causes movement of the other of the at least four rotor systems between the stowed configuration and the deployed configuration.

18. A method of operating a vehicle, comprising:
    providing a plurality of rotor systems, each rotor system comprising a rotor blade having a rotor blade axis of rotation and a configuration axis of rotation;
    moving a component to cause rotation of each rotor blade to rotate about their respective rotor blade axis of rotation and their respective configuration axis of rotation;
    wherein the configuration axes of rotation are axes of a transmission and each of the configuration axes are encircled by only one of the components;
    wherein the moved component that causes the rotation of each rotor blade to rotate about their respective rotor blade axis of rotation and their respective configuration axis of rotation is a flexible closed loop component.

19. The method of claim 18, wherein the closed loop component comprises at least one of a chain and a belt.

20. The method of claim 19, wherein the closed loop component comprises a toothed belt.

* * * * *